United States Patent [19]

Chiueh et al.

[11] Patent Number: 5,799,134
[45] Date of Patent: Aug. 25, 1998

[54] ONE DIMENSIONAL SYSTOLIC ARRAY ARCHITECTURE FOR NEURAL NETWORK

[75] Inventors: Tzi-Dar Chiueh, Taipei; Hwai-Tsu Chang, Hsinchu, both of Taiwan

[73] Assignee: Industrial Technology Research Institute, Hsinchu, Taiwan

[21] Appl. No.: 441,128

[22] Filed: May 15, 1995

Related U.S. Application Data

[63] Continuation-in-part of Ser. No. 403,523, Mar. 13, 1995, abandoned.

[51] Int. Cl.$^6$ .................................................. G06F 15/18
[52] U.S. Cl. ........................................... 395/24; 395/27
[58] Field of Search ............................ 395/27, 24, 800

[56] References Cited

U.S. PATENT DOCUMENTS

| | | | |
|---|---|---|---|
| 5,091,864 | 2/1992 | Baji et al. | 395/27 |
| 5,136,717 | 8/1992 | Morley et al. | 395/27 |
| 5,138,695 | 8/1992 | Means et al. | 395/27 |
| 5,148,385 | 9/1992 | Frazier | 395/27 |
| 5,216,751 | 6/1993 | Gardner et al. | 395/27 |
| 5,235,330 | 8/1993 | Ramacher et al. | 395/27 |
| 5,235,673 | 8/1993 | Austvold et al. | 395/76 |
| 5,274,832 | 12/1993 | Khan | 364/200 |
| 5,293,459 | 3/1994 | Duranton et al. | 39/27 |
| 5,337,395 | 8/1994 | Vassiliadis et al. | 395/27 |
| 5,475,793 | 12/1995 | Broomhead et al. | 395/27 |
| 5,509,106 | 4/1996 | Pechanek et al. | 395/27 |
| 5,517,598 | 5/1996 | Sirat | 395/27 |
| 5,519,811 | 5/1996 | Yoneda et al. | 395/27 |

OTHER PUBLICATIONS

Maria, "1D and 2D systolic implementations for radial basis function networks," IEEE 4th intl conf on microelectronics for neural networks, Dec. 1994.

"Widening world of neural nets," Electronics engineering times p. 35 Jul. 26, 1993.

Cornu, "Design implementation and test of a multi-model systolic neural network accelerator" scientific programming v5 n1 pp. 47–61, 1996.

Kwan, Systolic architecture for Hopfield network, BAM and multi-layer feed-forward network; 1989 IEEE International symposium on circuits and systems, pp. 790–793, Dec. 1989.

Zubair et al., Systolic implementation of neural networks, IEEE computer design—ICCD 1989 international conference, Dec. 1989.

Broomhead et al., A systolic array for nonlinear adaptive filtering and pattern recognition, 1990 IEEE international symposium on Circuits and systems, pp. 962–965, Dec. 1990.

Chen et al., A fuzzy neural network chip based on systolic array architecture, IEEE 1992 ASIC conference and exhibit, pp. 577–580, Feb. 1992.

Sheu, VLSI neurocomputing with analog programmable chips and digital systolic array chips, 1991 IEEE international symposium on circuits and systems, pp. 1267–1270, Apr. 1991.

Broomhead et al., Systolic array for nonlinear multidimensional interpolation, Electronics letters vol. 26 No. 1, pp. 7–9, Jan. 1990.

Kung et al., A unifying algorithm/architecture for artificial neural networks, Artificial Nerual Networks electronic implementations, IEEE Computer Society Press, pp. 120–123, Dec. 1990.

*Primary Examiner*—Allen R. MacDonald
*Assistant Examiner*—Jeffrey S. Smith
*Attorney, Agent, or Firm*—Meltzer, Lippe, Goldstein, Wolf & Schlissel, P.C.

[57] ABSTRACT

A circuit for implementing a neural network comprises a one dimensional systolic array of processing elements controlled by a microprocessor. The one dimensional systolic array can implement weighted sum and radial based type networks including neurons with a variety of different activation functions. Pipelined processing and partitioning is used to optimize data flows in the systolic array. Accordingly, the inventive circuit can implement a variety of neural networks in a very efficient manner.

15 Claims, 4 Drawing Sheets

ONE DIMENSIONAL SYSTOLIC ARRAY ARCHITECTURE FOR NEURAL NETWORK

RELATED APPLICATIONS

This is a continuation-in-part of U.S. patent application Ser. No. 08/403,523 filed on Mar. 13, 1995, now abandoned.

FIELD OF THE INVENTION

The present invention relates to a one dimensional systolic array architecture for implementing a neural network.

BACKGROUND OF THE INVENTION

A neural network comprises a relatively large number of simple processing elements which are known as neurons. The neurons are interconnected by connections known as synapses. A portion of a neural network is shown in FIG. 1. The neural network 10 of FIG. 1 comprises a plurality of neurons 12. The neurons 12 are interconnected by the synapses 14. In general, the output of any one particular neuron 12 is connected by a synapses 14 to the input of one or more other neurons 12 as shown in FIG. 1. Illustratively, the neurons 12 are arranged in layers. Three layers, 15, 16 and 17 are shown in FIG. 1. However, an arrangement of neurons into layers is not necessary.

In general, neural networks are used for a wide variety of "learning" type tasks, such as character recognition, speech recognition and dynamic routing.

In general, the output $Y_i$ of a neuron i may be represented as $$Y_i = S\left(\sum_j f(w_{ij}, x_j)\right) = S(g_i) \quad (1)$$

where $x_j$ is an input signal of the neuron i which is transmitted by a synapse, for example, from the output of another neuron j.

$w_{ij}$ is a weight associated with a synapse from the output of the neuron j to the input of the neuron i $f(w_{ij}, x_j)$ equals $w_{ij} x_j$ in the case of a weighted sum network or equals $(w_{ij} - x_j)^2$ in the case of a radial based network.

S (z) is an activation function which may be a sigmoid function, a gaussian function, a linear function, a step function which has the values $S(z)=+1$, $z \geq 0$; $S(z)=-1$, $z<0$, or a square function which has the values $S(z)=0$, $|z|>\delta$; $S(z)=1$, $|z| \leq \delta$, where $\delta$ is a constant.

FIG. 2 shows a neuron having a plurality of inputs $x_j$, j=1, 2, . . . , delivered via synapses with weights $w_{ij}$. The output of the neuron of FIG. 2 is $Y_i$.

Table 1 below lists a variety of radial-based and weighted sum neuron types, all of which are sub-species of the general neuron described in Equation (1).

TABLE 1

| Neuron Type | Neuron Transfer Equation |
|---|---|
| BP | $Y_i = S_1(\sum_j w_{ij} \cdot x_j)$ |
| Hopfield | $Y_i = S_1(\sum_j (w_{ij} \cdot x_j))$ |
| RBF | $Y_i = S_2(\sum_j (w_{ij} - x_j)^2)$ |

TABLE 1-continued

| Neuron Type | Neuron Transfer Equation |
|---|---|
| RCE | $Y_i = S_3(\sum_j (w_{ij} - x_j)^2)$ |
| WTA | $Y_i = S_4(\sum_j (w_{ij} \cdot x_j)^2)$ |
| MADALINE | $Y_i = S_5(\sum_j (w_{ij} - x_j))$ |
| ADALINE | $Y_i = S_5(\sum_j (w_{ij} - x_j))$ |
| MADALINE III | $Y_i = S_1(\sum_j (w_{ij} - x_j))$ |

In this table, $S_1$ is a sigmoid activation function, $S_2$ is a Gaussian activation function, $S_3$ is a square activation function, $S_4$ is a linear activation function, $S_5$ is a step activation function.

A variety of circuit architectures have been proposed in the prior art for implementing neural networks. A first type of neural network circuit comprises a one dimensional or multidimensional array of microprocessors or digital signal processors which implement the functions of the neurons and synapses of a neural network. However, because the hardware architecture is not exclusively used for implementing neural networks, and some programming may be required, the speed, after implementation in an IC, is about several hundred kilo-connections per second. A neural network circuit of this type is disclosed in U.S. Pat. No. 5,204,938.

A second type of neural network circuit comprises a two dimensional array of multipliers for multiplying synaptic weights $w_{ij}$ and input signals $x_j$. Generally, this architecture is implemented in VLSI using a current mode analog technique. The speed is approximately several giga connections per second. A disadvantage is that analog-to-digital and digital-to-analog converters are required for an exchange of signals with external digital systems. A neural network circuit of this type is disclosed in U.S. Pat. No. 5,087,826.

A third type of neural network or architecture comprises a one-dimensional systolic array of processing elements. The advantage of the one dimensional systolic array is that pipelining can be used to increase circuit speed. A typical implementation has a speed of several mega-connections per second. A typical architecture of this type is disclosed in U.S. Pat. No. 5,091,864.

All of the above-mentioned architectures, including the one dimensional systolic array architecture, have a significant short coming in that, these architectures can be used to implement weighted sum type neural network but cannot be used to implement a radial based neural network.

In view of the foregoing, it is an object of the present invention to provide a one dimensional systolic array implementation of a neural network which can implement weighted sum and radial based neural networks.

It is a further object of the invention to provide a neural network circuit comprising a one dimensional systolic array of processing elements which is controlled by a microprocessor (or other controller); which controller selects between radial based and weighted sum neurons by transmitting a control signal to the systolic array.

It is also an object of the invention to provide a neural network circuit in the form of a one dimensional systolic array which utilizes pipelined processing and partitioning to achieve a highly efficient data flow in the neural network circuit.

SUMMARY OF THE INVENTION

The present invention is a neural network circuit comprising a one-dimensional systolic array controlled by a controller (e.g. a microprocessor).

In a preferred embodiment, the one dimensional systolic array comprises M processing elements (PE's). The $i^{th}$ processing element, i=1,2, . . . ,M comprises a weight storage circuit for storing a sequence of synaptic weight $w_{ij}$, j=1,2,3 . . . ,N. Each processing element also includes a processor for receiving a sequence of inputs $x_j$ and for outputting an accumulated value.

$$g_i = \sum_j f(w_{ij}, x_j)$$

The $i^{th}$ processing element also includes a storage element for storing $g_i$. This storage element is the $i^{th}$ storage element in a shift register comprising M storage elements, one in each processing element. The one dimensional systolic array also includes an activation function circuit for receiving the accumulated values $g_i$ sequentially from the shift register and for outputting a sequence of values $Y_i = S(g_i)$, where S is an activation function.

As indicated above, the one dimensional systolic array is controlled by a microprocessor. The weight storage circuits in the processing elements are connected to the microprocessor via a weight (W) bus and an address (A) bus. The sequences of synaptic weight $w_{ij}$ are transmitted via the W-bus to the particular weight storage circuit indicated by the A-bus. The microprocessor also transmits a select signal to each processing element (PE-i) to choose between a weighted sum neuron or a radial based neuron (i.e., to select $f(w_{ij}, x_j)$). The microprocessor also receives the values $Y_i$ from the activation function circuit in order to generate subsequent sets of input values $x_j$ and updated weights $w_{ij}$. The simplified set of connections between the control processor and the one dimensional systolic array is a significant advantage of the invention.

The one-dimensional systolic array takes advantage of pipelining and partitioning to achieve an efficient data flow and an efficient use of hardware resources.

DETAILED DESCRIPTION OF THE INVENTION

Figure 3:
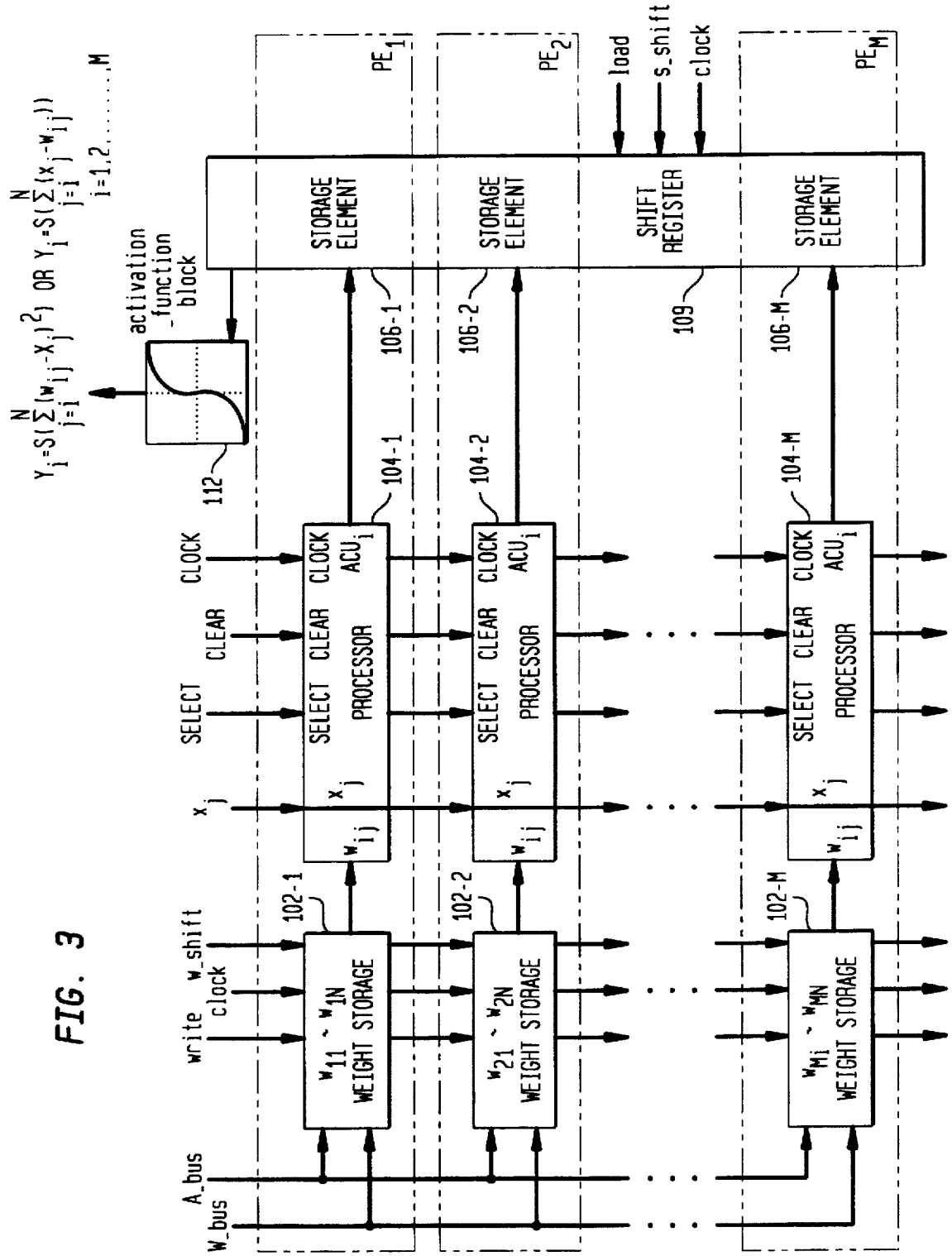
FIG. 3 illustrates a one dimensional systolic array for implementing a neural network in accordance with an illustrative embodiment of the present invention.

FIG. 3 illustrates a one dimensional systolic array in accordance with an illustrative embodiment of the present invention. The systolic array 100 comprises a plurality of processing elements PE-i, i=1,2, . . . ,M. Each processing element PE-i comprises a weight storage circuit 102-i. The weight storage circuit 102-i is a digital memory such as a RAM in most embodiments, although in some cases analog storage devices such as capacitors may be used. Each weight storage circuit stores a set of synaptic weights $w_{ij}$, j=1,2, . . . ,N. In some cases, more than one set of synaptic weights may be stored so that the capacity of each weight storage circuit is a multiple of N.

The synaptic weights $w_{ij}$ are transmitted to the weight storage circuit 102-i from a control microprocessor (not shown in FIG. 3). A set of synaptic weights $w_{ij}$ is down loaded via the W-bus from the control microprocessor to the particular weight storage circuit 102-i indicated by the address on the A-bus. The write signal is enabled for a set of weights $w_{ij}$ to be written into a weight storage circuit 102-i.

When the shift control signal w-shift is enabled, the stored set of weights $w_{i1}, w_{i2}, \ldots, w_{iN}$ is shifted sequentially out of the weight storage circuit 102-i synchronously with the clock signal.

Each processing element PE-i also includes a processor 104-i. The processor 104-i is a circuit for evaluating $$g_i = \sum_j f(w_{ij}, x_j).$$

Each processor 104-i includes an input which is connected to the corresponding weight storage circuit 102-i for receiving in sequence the synoptic weights $w_{i1}, w_{i2}, \ldots, w_{iN}$. Each processor 104-i also includes an input for receiving in sequence the inputs $x_j$. In each clock cycle, one $w_{ij}$ is received and one $x_j$ is received and one value $f(w_{ij}, x_j)$ is determined by the processor 104-i.

The processor 104-i receives a select signal to choose a particular function f (weighted sum or radial based), a clear signal for clearing an accumulator (see FIG. 4) and a clock signal.

The processor 104-i outputs at the ACU output a signal $$g_i = \sum_j f(w_{ij}, x_j)$$

Each processing element PE-i contains a storage element 106-i. Each storage element 106-i stores a value $g_i$ received from the corresponding processor 104-i. These values are loaded into the storage elements 106-i in response to the load signal. The storage elements 106-i are connected to form a shift register 109. In response S-shift signal, the elements $g_i$ are shifted sequentially out of the shift register 109 synchronously with the clock signal.

The elements $g_i$ are transmitted to the activation function circuit 112. This circuit implements any one of the plurality of activation functions discussed above (e.g. sigmoid, gaussian, linear, step, square, etc.).

The output of the activation function 112 is a sequence of values $$Y_i = S(g_i)$$

Figure 4:
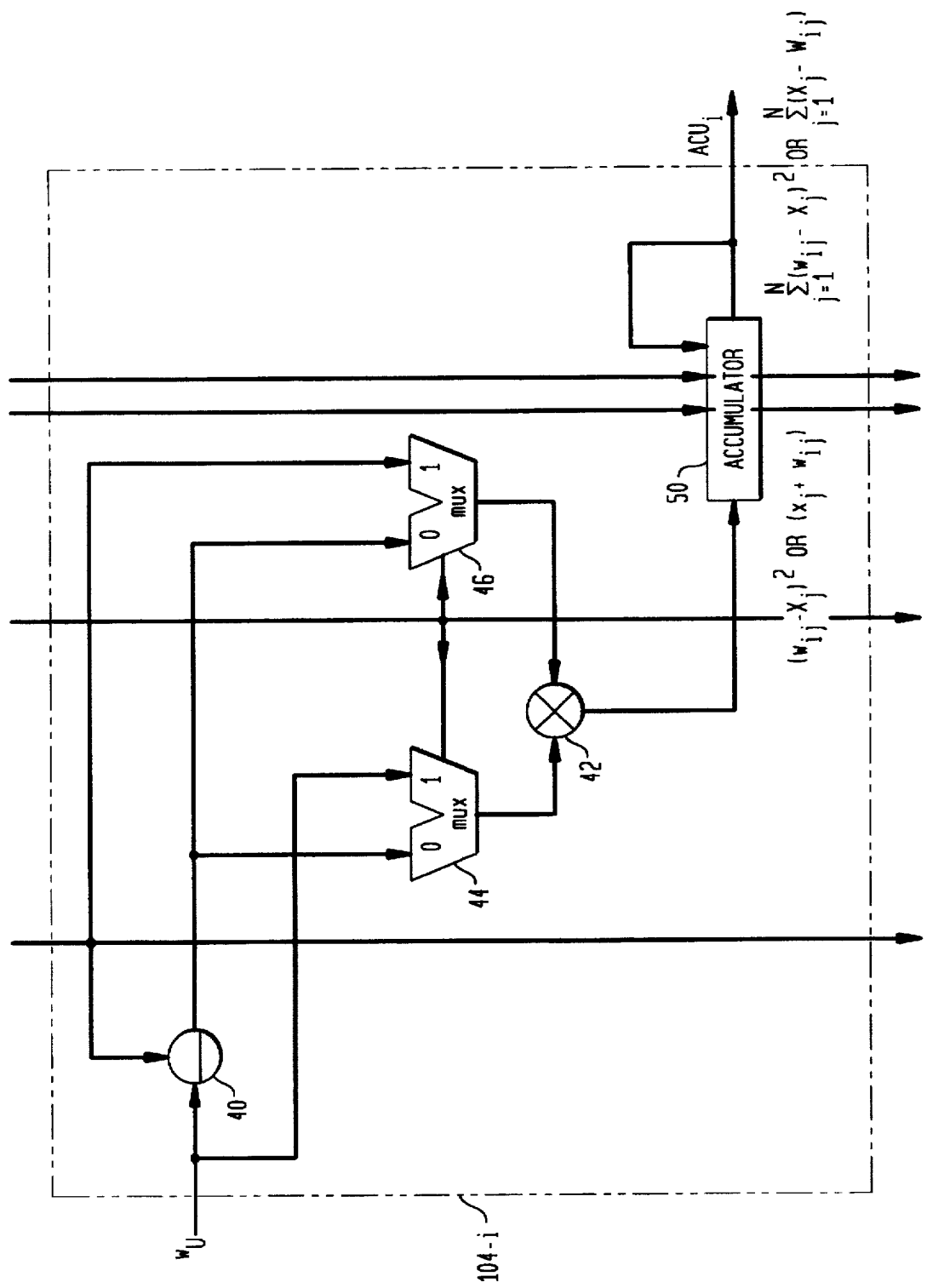
FIG. 4 illustrates a processor located in each processing element of the systolic array of FIG. 3.

The processor 104-i is shown in greater detail in FIG. 4. Each processor 104-i comprises a subtractor 40, a multiplier 42, a pair of multiplexors 44 and 46, and an accumulator 50. The multiplexers 44 and 46 receive a select signal which determines if a weighted sum or radial based neuron is implemented. In each clock cycle one weight $w_{ij}$ and one input value $x_j$ is received. In the case of a weighted sum, the multiplexer 44 outputs $w_{ij}$ and the multiplexer 46 outputs $x_j$. These quantities are multiplied by the multiplier 42. In the case of the radial-based neuron, each multiplexer outputs ($w_{ij}-x_j$) and this quantity is squared by the multiplier 42. In each clock cycle, one value (($w_{ij} \cdot x_j$) or ($w_{ij}-x_j)^2$) is inputted to the accumulator 50. These values are then accumulated by the accumulator 50 to output $g_i$.

The timing of the systolic array 100 is as follows. It takes N clock cycles to obtain $$g_i = \sum_j f(w_{ij}, x_j)$$

in each processing element PE-i. It requires another clock cycle to load the shift register 109 with the values $g_i$. Another M clock cycles is required to shift the values $g_i$ out of the shift register 109 and through the activation function block 112.

Figure 5A:
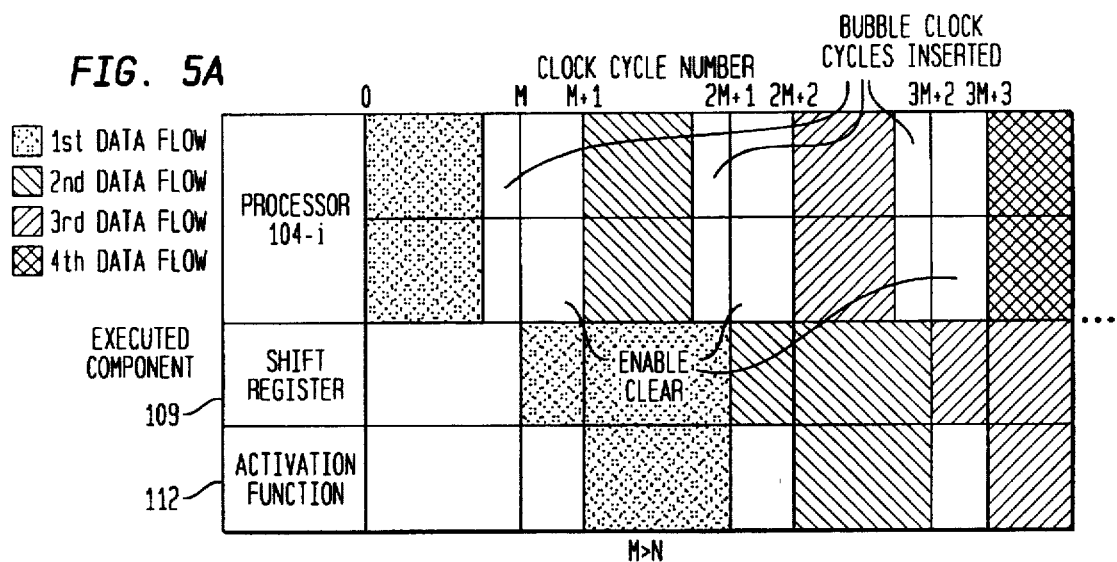
FIGS. 5A, 5B and 5C illustrates the flow of data from the timing point of view in the inventive systolic array.
Figure 5B:
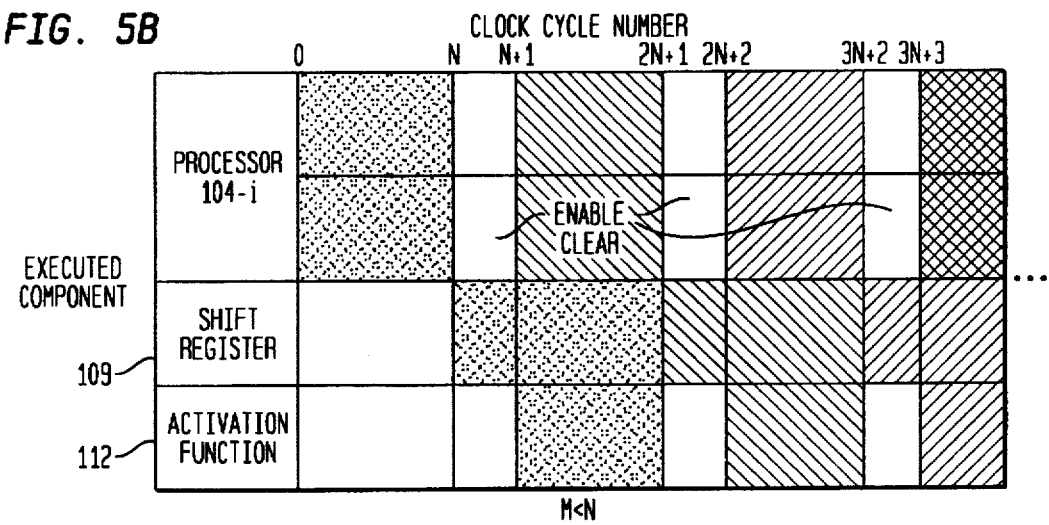
Figure 5C:
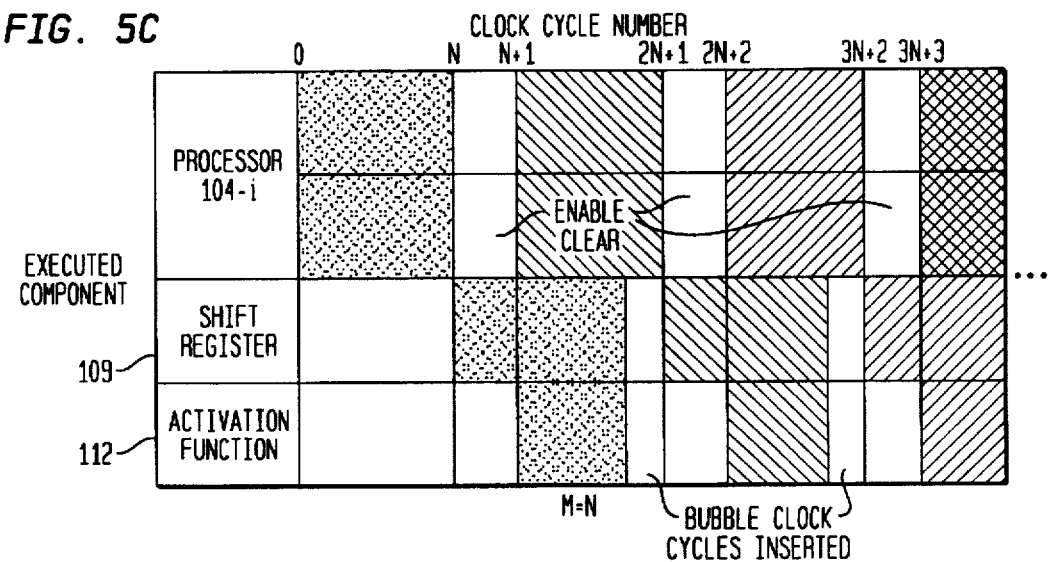

FIGS. 5A, 5B and 5C illustrate how the hardware resources are utilized as a function of clock cycle for the case M>N, M=N, M<N respectively. In each of the Figures, the shading indicates which hardware elements are active in particular clock cycles. Different shadings represent different data flows. It appears that optimal use of the hardware resources occurs when M=N.

Consider the following examples. Consider a neural network with M=8 neurons arranged in one layer (i.e., in one row). If this network is implemented with a systolic array of M=8 processing elements and N=8, then the weights to be stored in each processing element PE-i is as shown in Table 2.

TABLE 2

| Processing Elements | N | | | | | | | |
|---|---|---|---|---|---|---|---|---|
| | 1 | 2 | 3 | 4 | 5 | 6 | 7 | 8 |
| PE-1 | $w_{11}$ | $w_{12}$ | $w_{13}$ | $w_{14}$ | $w_{15}$ | $w_{16}$ | $w_{17}$ | $w_{18}$ |
| PE-2 | $w_{21}$ | $w_{22}$ | $w_{23}$ | $w_{24}$ | $w_{25}$ | $w_{26}$ | $w_{27}$ | $w_{28}$ |
| PE-3 | $w_{31}$ | $w_{32}$ | $w_{33}$ | $w_{34}$ | $w_{35}$ | $w_{36}$ | $w_{37}$ | $w_{38}$ |
| PE-4 | $w_{41}$ | $w_{42}$ | $w_{43}$ | $w_{44}$ | $w_{45}$ | $w_{46}$ | $w_{47}$ | $w_{48}$ |
| PE-5 | $w_{51}$ | $w_{52}$ | $w_{53}$ | $w_{54}$ | $w_{55}$ | $w_{56}$ | $w_{57}$ | $w_{58}$ |
| PE-6 | $w_{61}$ | $w_{62}$ | $w_{63}$ | $w_{64}$ | $w_{65}$ | $w_{66}$ | $w_{67}$ | $w_{68}$ |
| PE-7 | $w_{71}$ | $w_{72}$ | $w_{73}$ | $w_{74}$ | $w_{75}$ | $w_{76}$ | $w_{77}$ | $w_{78}$ |
| PE-8 | $w_{81}$ | $w_{82}$ | $w_{83}$ | $w_{84}$ | $w_{85}$ | $w_{86}$ | $w_{87}$ | $w_{88}$ |

Now consider the situation where, the neural network has eight neurons, arranged in a row but the systolic array used to implement the neural network has only four processing elements. This is the case where M=4, N=8, i.e., there are four processing elements PE-1, PE-2, PE-3, PE-4.

In this case, the synaptic weights are stored in the PE's according to Table 3 below:

TABLE 3

| |
|---|
| $w_{1j}$, $w_{5j}$ stored in PE-1 |
| $w_{2j}$, $w_{6j}$ stored in PE-2 |
| $w_{3j}$, $w_{7j}$ stored in PE-3 |
| $w_{4j}$, $w_{8j}$ stored in PE-4 |

In a first set of clock cycles a set of inputs $x_j$ is entered into the PE's and processed with the synoptic weights $w_{1j}, \ldots, w_{4j}$. In a second set of clock cycles the same set of inputs $x_j$ is again entered into the PE's and combined with synaptic weights $w_{5j}, \ldots, w_{8j}$. With this kind of partitioning, efficient use of the hardware resources in the one dimensional systolic array can be achieved.

Figure 1:
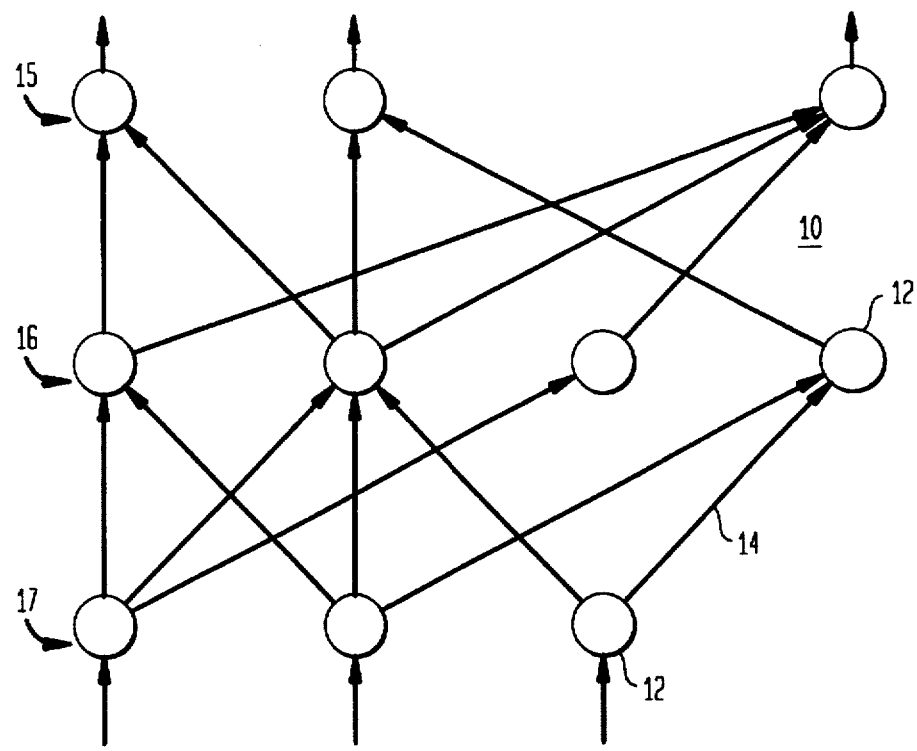
FIG. 1 schematically illustrates a neural network.
Figure 2:
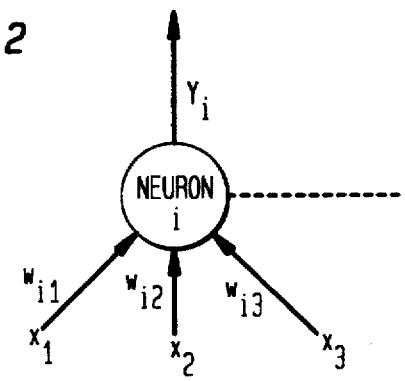
FIG. 2 schematically illustrates a neuron for use in the network of FIG. 1.
Figure 6:
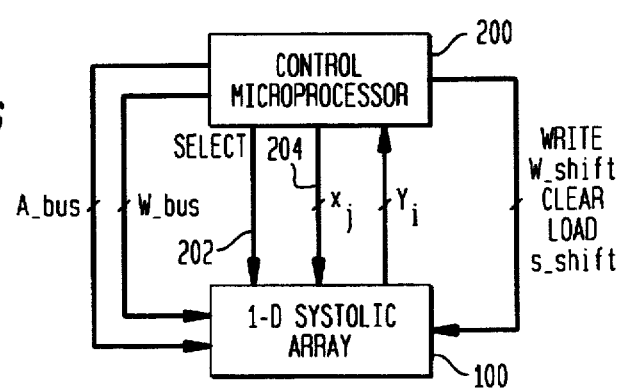
FIG. 6 illustrates the interconnections between a one dimensional systolic array and a control microprocessor in accordance with the invention.

FIG. 6 shows how the systolic array 100 is controlled by a control processor 200. The microprocessor 200 transmits updated synaptic weights to the PE's in the systolic array via the W-bus. The synaptic weights are transmitted to particular PE's indicated by addresses on the A-bus. The microprocessor transmits a select signal via a select line 202 to determine the type of neural network (radial based or weighted sum). The inputs $x_j$ are transmitted from the microprocessor 200 to the systolic array 100 via the lines 204. The systolic array 100 outputs the values $Y_i$ via the lines 206 to the microprocessor 200 which uses these values to update the synaptic weights.

The simplified connections between the control microprocessor 200 and the one-dimensional systolic array 100 are a significant advantage of the invention.

In short, a one-dimensional systolic array for implementing a neural network has been disclosed. Finally, the above-described embodiments of the invention are intended to be illustrative only. Numerous alternative embodiments may be devised by those skilled in the art without departing from the spirit and scope of the following claims.

We claim:

1. A neural network circuit, comprising:
   a one dimensional systolic array of M processing elements, the $i^{th}$ processing element, i=1,2, ... ,M, comprising:
   a weight storage circuit for storing synaptic weights $w_{ij}$, j=1,2, ... ,N;
   a processor for receiving a sequence of inputs $x_j$ and for outputting an accumulated value:

$$g_i = \sum_j f(w_{ij}, x_j),$$

where $f(w_{ij}, x_j)$ equals $w_{ij} \cdot x_j$ if a weighted sum network is selected or equals $(w_{ij}-x_j)^2$ if a radial based network is selected, said processor comprising:
   first and second multiplexers, each multiplexer receiving said select signal for determining whether said weighted sum or said radial based network is selected; and
   a multiplier for multiplying the output from said first multiplexer with the output from said second multiplexer to generate said function $f(w_{ij}, x_i)$,
   wherein said output of said first multiplexer being $w_{ij}$ and the output of said second multiplexer being $x_i$ when said select signal indicates a weighted sum network, and
   wherein said output of said first multiplexer being ($w_{ij}-x_i$) and the output of said second multiplexer being ($w_{ij}-x_i$) when said select signal indicates a radial based network;
   a storage element for storing $g_i$, said storage element being an $i^{th}$ storage element in a shift register comprising M storage elements; and
   said one dimensional systolic array also comprising an activation function circuit for sequentially receiving said accumulated values $g_i$ from said shift register and for outputting a sequence of values $Y_i=S(g_i)$, where S is an activation function.

2. The neural network circuit of claim 1 further comprising a control circuit connected to said one dimensional systolic array for selecting said function $f(w_{ij},x_j)$.

3. The neural network circuit of claim 1 wherein said processor in said $i^{th}$ processing element comprises:
   a circuit for receiving a sequence of values $w_{ij}$ from said weight storage circuit, a sequence of input values, $x_j$, and a select signal for selecting a particular function f, and for outputting a sequence of values $f(w_{ij},x_j)$; and
   an accumulator for accumulating said values $f(w_{ij},x_j)$ to obtain $g_i$.

4. The neural network circuit of claim 1 wherein said activation function S is selected from a group consisting of sigmoid function, gaussian function, linear function, step function, and square function.

5. The neural network circuit of claim 1 further comprising
a control processor for outputting said synaptic weights $w_{ij}$ to each of said processing elements.

6. The neural network circuit of claim 5 further including an address bus and a synaptic weight bus connecting said control processor and said one dimensional systolic array, said synaptic weight bus transmitting synoptic weight values $w_{ij}$ to a particular processing element i identified by said address bus.

7. The neural network circuit of claim 6 wherein said control processor transmits said input values $x_{ij}$ to said processing elements, transmits a select signal to said processing elements to select said function $f(w_{ij},x_j)$ and receives said values $Y_i$ from said activation function circuit.

8. The neural network circuit of claim 1 wherein M=N.

9. The neural network circuit of claim 1 wherein M>N.

10. The neural network circuit of claim 1 wherein M<N.

11. The neural network circuit of claim 10 wherein, in each of said processing elements, in a first set of clock cycles a first sequence of synoptic weights $w_{ij}$ is combined with a sequence of values $x_j$ according to the function $$g_i = \sum_j f(w_{ij}, x_j)$$

to obtain a first set of values $Y_i$ and in a second set of clock cycles a second sequence of synoptic weights $w_{ij}$ is combined with the same sequence of values $x_j$ according to the function $$g_i = \sum_j f(w_{ij}, x_j)$$

to obtain a second set of values $Y_i$.

12. A neural network circuit comprising a one dimensional systolic array of M processing elements; and
a control processor,
said control processor transmitting to the $i^{th}$ processing element, i=1,2, . . . ,M, a set of synaptic weights $w_{ij}$, j=1,2, . . . ,N, said $i^{th}$ processing element comprising:
first and second multiplexers, each multiplexer receiving said select signal for determining whether said weighted sum or said radial based network is selected; and
a multiplier for multiplying the output from said first multiplexer with the output from said second multiplexer to generate said function $f(w_{ij},x_i)$,
wherein said output of said first multiplexer being $w_{ij}$, and the output of said second multiplexer being $x_i$ when said select signal indicates a weighted sum network, and
wherein said output of said first multiplexer being $(w_{ij}-x_i)$ and the output of said second multiplexer being $(w_{ij}-x_i)$ when said select signal indicates a radial based network;
said control processor transmitting to each of said processing elements a set of values $x_j$;
said control processor outputting a select signal to said one dimensional systolic array to select said function $f(w_{ij}, x_i)$, where $f(w_{ij}, x_j)$ equals $w_{ij}x_j$ if a weighted sum network is selected or equals $(w_{ij}-x_j)^2$ if a radial based network is selected; and
said one-dimensional systolic array outputting to said control processor a set of values $Y_i=S$, where S is an activation function and $$g_i = \sum_j f(w_{ij}, x_j).$$

13. The neural network circuit of claim 12 wherein said control processor updates said synoptic weights $w_{ij}$ in response to said values $Y_i$ and transmits said updated synoptic weights to said processing elements in said one dimensional systolic array.

14. The neural network circuit of claim 12 wherein each of said processing elements in said one dimensional systolic array comprises:
a synoptic weight storage circuit for storing synoptic weights;
a circuit for receiving said synoptic weights $w_{ij}$ from said synoptic weight storage circuit and said values $x_j$ from said control processor and for outputting a sequence of values $f(w_{ij}, x_j)$; and
an accumulator for accumulating said values $f(w_{ij}, x_j)$ to output $g_i$.

15. A processing element for use in a one-dimensional systolic array used to implement a neural network, said processing element comprising:
a weight storage circuit for storing a sequence of synoptic weights $w_{ij}$;
a processor for receiving a sequence on input values and for outputting $f(w_{ij}, x_j)=w_{ij}x_i$, or $f(w_{ij},x_j)=(w_{ij}-x_j)^2$ depending on whether the value of a select signal received at said processor represents a weighted sum network or a radial based network, respectively, said processor comprising:
first and second multiplexers, each multiplexer receiving said select signal for determining whether said weighted sum or said radial based network is selected; and
a multiplier for multiplying the output from said first multiplexer with the output from said second multiplexer to generate said function $f(w_{ij},x_i)$,
wherein said output of said first multiplexer being $w_{ij}$ and the output of said second multiplexer being $x_i$ when said select signal indicates a weighted sum network, and
wherein said output of said first multiplexer being $(w_{ij}-x_i)$ and the output of said second multiplexer being $(w_{ij}-x_i)$ when said select signal indicates a radial based network;
an accumulator for forming the accumulation; and $$g_i = \sum_j f(w_{ij}, x_j)$$

an activation function circuit for applying an activation function to the values $g_i$.

* * * * *